United States Patent [19]
Moriarty

[11] 4,438,937
[45] Mar. 27, 1984

[54] PISTON RING

[76] Inventor: Maurice J. Moriarty, 3225 W. Sahuaro, Phoenix, Ariz. 85029

[21] Appl. No.: 447,237

[22] Filed: Dec. 6, 1982

[51] Int. Cl.³ .............................................. F16J 9/12
[52] U.S. Cl. .................................... 277/215; 277/216
[58] Field of Search ............... 277/215, 216, 217, 236, 277/237

[56] References Cited

U.S. PATENT DOCUMENTS

| 1,214,429 | 1/1917 | Cook | 277/215 |
| 1,401,930 | 12/1921 | Wainwright | 277/215 |
| 1,418,918 | 6/1922 | Hall | 277/215 X |
| 1,488,296 | 3/1924 | Stevens | 277/215 X |
| 2,042,820 | 6/1936 | Bax | 277/215 |
| 3,186,723 | 6/1965 | Wagner | 277/215 X |

FOREIGN PATENT DOCUMENTS

| 19971 | 12/1980 | European Pat. Off. | 277/215 |
| 2254083 | 5/1973 | Fed. Rep. of Germany | 277/215 |
| 54-125345 | 9/1979 | Japan | 277/215 |
| 373594 | 1/1964 | Switzerland | 277/215 |

OTHER REFERENCES

Europatent No. 0019971

Primary Examiner—Robert S. Ward
Attorney, Agent, or Firm—Don J. Flickinger

[57] ABSTRACT

The area of the cross-section of a piston is reduced while maintaining the over-all dimensions of the cross-section such that the ring is usable in the conventional ring groove of a piston and cylinder assembly. The reduction in the area of the cross-section decreases the inertia of the ring for increased responsiveness to the operating conditions of the assembly. In accordance with a preferred embodiment, the area is reduced by forming a continuous groove in one of the surfaces of the ring.

11 Claims, 6 Drawing Figures

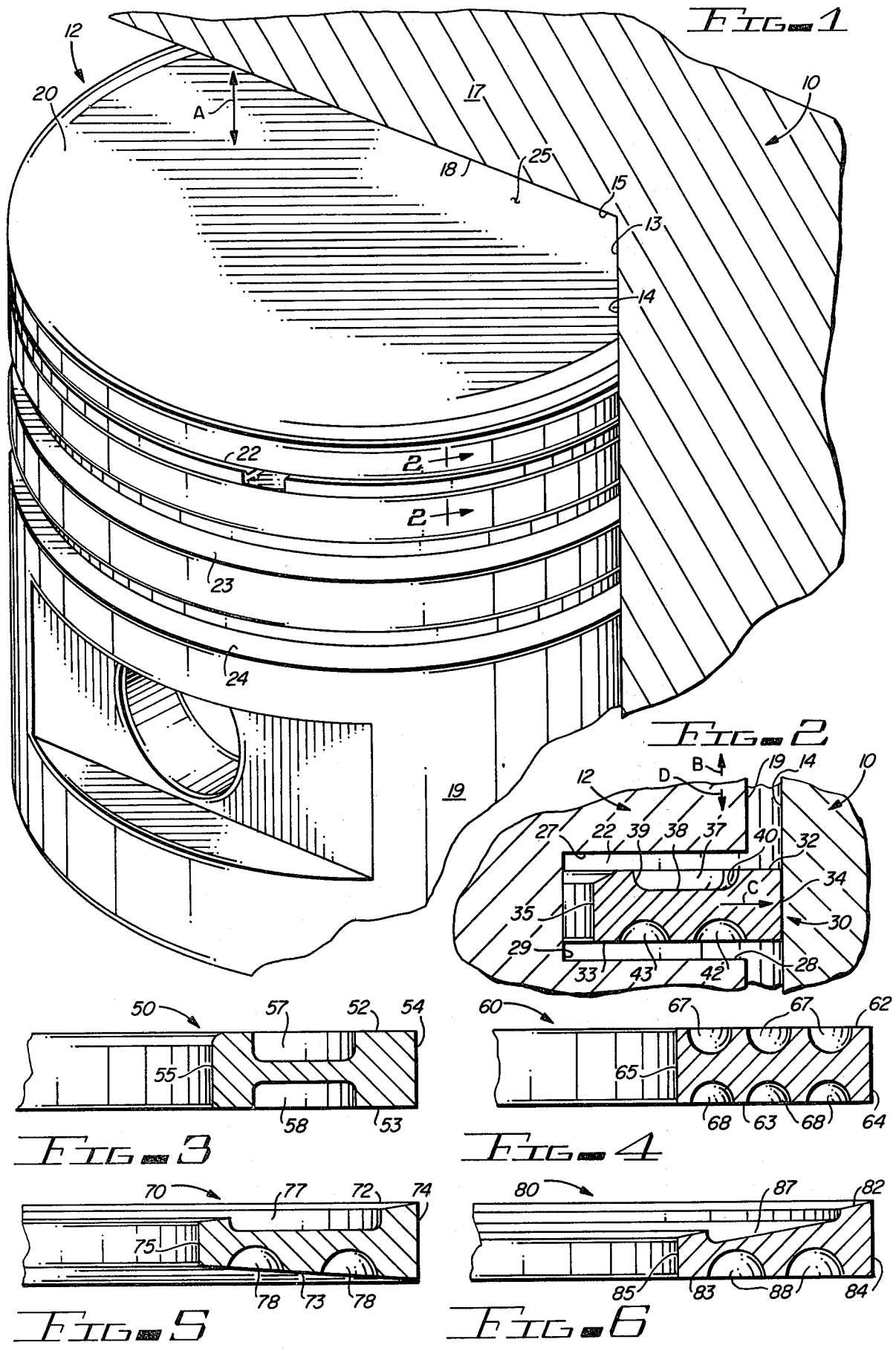

PISTON RING

FIELD OF THE INVENTION

This invention relates to annular seals.

More particularly, the present invention relates to annular seals of the tupe commonly employed in piston and cylinder assemblies.

In a further aspect, the instant invention concerns an improved seal having increased responsiveness to the operating conditions imposed by a piston and cylinder assembly.

PRIOR ART

Various mechanical devices incorporate a piston and cylinder assembly. Typically, the piston is reciprocally disposed within a bore of the cylinder. A space or chamber of variable capacity is defined within the bore between the one end or top of the piston and the closed end or head of the cylinder.

Exemplary are fluid pressure motors, either hydraulic or pneumatic, and internal combustion engines utilizing various fuels. In response to the pressure of fluid introduced into the chamber or expanded within the chamber, the piston is caused to move. The movement of the piston is harnessed to produce useful work such as linear movement of an operating rod or rotational movement of a driveshaft.

Annular seals, of the type commonly referred to as piston rings, are normally employed to provide a seal between the piston and the surface of the wall of the bore. Specifically, it is the responsibility of the piston ring to maintain the pressurized fluid within the chamber.

Typically, a piston ring is generally rectangular in cross-section as defined by a top surface, an undersurface, and cylindrical inner and outer surfaces. The outer surface, which bears against the surface of the wall is termed the face. The ring is discontinuous, having a radial slit, dubbed the end gap, which allows for expansion of the ring during assembly and to compensate for wear.

Formed into the piston is an annular ring groove which matingly receives the piston ring. The width of the groove, the dimension between the upper and lower surfaces, is slightly greater than the thickness, dimension across the top and bottom surfaces, of the ring. Known as side clearance, the difference permits the ring to move or work within the groove.

The ring is elastically expansive. That is, the ring has an inherent tendency to expand radially outward. Accordingly, the ring projects from the piston to bridge the wall clearance, the distance from the piston to the bore, and urge the face of the ring against the surface of the bore of the cylinder. Substantial clearance exists between the inner surface of the ring and the inner surface or bottom of the ring groove.

While analogous situations exist in all types of piston and cylinder assemblies, the operating conditions within an internal combustion engine of the ilk conventionally utilized in contemporary passenger vehicles, are particularly demonstrative of the environmental setting and the functioning of a typical piston ring adopted for compression sealing.

The exemplary engine operates in a range of approximately three thousand to four thousand revolutions per minute during cruising speed of the vehicle. Power peaks may exceed six thousand revolutions per minute. Exotic models obtain upwards of fourteen thousand revolutions per minute.

During each revolution of the engine, the piston passes though two stokes; an upstroke in the direction of the cylinder head and a downstroke in the opposite direction. Each stroke is separated by a stop and change of direction. Intermediately, at an engine speed of six thousand revolutions per minute, the piston travels at a velocity of roughly four thousand feet per minute.

During the upstroke, either the exhaust or compression phase of the universal Otto cycle engine, the undersurface of the ring bears against the lower surface of the ring groove as the ring is carried along by the piston. The face of the ring projects beyond the outside diameter of the piston and bears against the surface of the bore in response to the inherent expansiveness of the ring. A ring fabricated of cast iron, a favored material of construction, exhibits a tangential tension of seven to nine pounds outwardly against the wall of the bore.

In the course of a downstroke, specifically the power stroke subsequent to ignition, the ring is held against the lower surface of the groove in response to the gases of combustion. The expanding gases, passing between the top surface of the ring and the upper surface of the groove, enter the space between the inner surface of the ring and the bottom or inner diameter of the ring groove. In response thereto, the gases, at a nominal pressure of six hundred to nine hundred pounds per square inch, urge the ring outwardly to effect the desired sealing contact with the surface of the bore.

The transition between the upstroke and the downstroke, termination of the upstroke, stop and initiation of the downstroke, is exceedingly demanding. The ring, owing to ineria when the piston stops, continuous to travel in the upward direction and is dashed against the upper surface of the groove. The pounding tends to upset the piston, especially distorting the ring groove. Further, the shock subjects the frangible cast iron ring to breakage.

The ring continues to bear against the upper surface of the ring groove during ignition and commencement of the downward power stroke. Optimumly, the expanding gases urge the ring downwardly against the lower surface of the ring and outwardly against the bore to create an effective seal. The seal is by way of an airtight contact between the undersurface of the ring and the lower surface of the groove and between the face of the piston and the surface of the bore.

In actual practice, however, the pressure of the gases of combustion are not always successful in overcoming the inertia of the ring. Accordingly, the gases flow around the ring, between the upper surface of the groove and the top surface of the ring and between the bottom surface of the groove and the under surface of the ring, causing vibration of the ring in a condition known as "ring flutter". The vibration peens and distorts the groove as well as subjecting the ring breakage. Additionally, the needed seal is lost during ring flutter. The escaping gases reduce engine power and contaminate oil in the crankcase below.

Inertia of the ring is largely a result of the mass of the ring and the friction between the ring and the several respective contracting surfaces. As a consequence of the advent of the short stroke, high speed engine subsequent to World War II, the height or thickness of the ring was decreased from the previous standard of three sixteenths of an inch to the current standard of five sixtyfouths of an inch. The current ring, then, was substantially lighter and presented less contact area to the surface of the bore. Nevertheless, ring flutter persists today.

The prior art has proposed several piecemeal and ineffective solutions to the problems associated with flutter. One proposal suggested a thinner ring analogous to the conventional oil control rail. While having significantly reduced mass, the ring lacked a face of adequate surface to provide the required seal. Further, being fabricated of steel as necessary for a ring of the proposed width, the ring became warped and misshaped when subjected to the temperature generated by the gases of combustion.

To reduce friction, it has been relatively common practice to coat or impregnate the ring with a friction reducing material such as molybdenum. Highly effective initially, the material is dissipated with time and wear. Ductile iron, substituted for cast iron, reduces breakage. However, ductile iron seals have an inherent tangential tension approximately equal to twice that of the standard cast iron ring, an undesirable characteristic.

For the foregoing and other reasons, it would be highly advantageous to remedy the deficiencies of the prior art.

Accordingly, it is an object of the present invention to provide and improve an inner seal.

Another object of the invention is the provision of an annular seal for sealing a reciprocally movable piston within the bore of a cylinder.

And another object of the invention is to provide a piston ring having improved responsiveness to the operating conditions impossed by a piston and cylinder assembly.

Still another object of the instant invention is the provision of a piston ring which is less susceptible to the forces or inertia.

Yet another object of the invention is to provide an improved piston ring which is usable in pre-existing, conventional ring grooves.

Yet still another object of this invention is the provision of a piston ring of reduced mass.

And a further object of the invention is to provide a piston ring exhibiting reduced frictional contact with the surfaces of the ring groove.

Yet a further object of the immediate invention is the provision of an annular seal especially adapted for use as the compression ring in an internal combustion engine.

Still a further object of the invention is to provide a piston ring which, when unassisted, will exert decreased pressure upon the surface of the bore.

And yet a further object of the invention is the provision of an annular seal, according to the above, which is relatively inexpensive and uncomplicated to manufacture.

SUMMARY OF THE INVENTION

Briefly, to achieve the desired objects of the instant invention and provide an annular seal of increased responsiveness for use in a conventional pre-existing ring groove in a piston and cylinder assembly, provided are means for decreasing the inertia of a piston ring while preserving the fixed exterior dimensions of the cross section of the ring. The means for reducing the inertia may be in the form of means for reducing the mass of the ring. The means for reducing the inertia may also be in the form of means for reducing the area of contact between the ring and the ring groove.

More specifically, the mass of the ring is reduced by reducing the area of the cross section of the ring. Even more specifically, the mass of the ring and the area of contact between a selected surface of the ring and the respective surface of the ring groove is reduced by a recess formed into the selected surface of the ring. The recess may be in the form of a channel extending continuously along the selected surface of the ring intermediate the inner and outer surfaces.

BRIEF DESCRIPTION OF THE DRAWINGS

The foregoing and further and more specific objects of the instant invention will become readily apparent to those skilled in the art from the following detailed description of preferred embodiments thereof taken in conjunction with the drawings, in which:

FIG. 1 is a broken perspective view of a conventional piston and cylinder assembly incorporating an annular seal or piston ring fabricated in accordance with the teachings of the instant invention;

FIG. 2 is an enlarged fragmentary vertical sectional view taken along the line 2—2 of FIG. 1;

FIG. 3 is a vertical sectional view, similar to the illustration of the ring of FIG. 2, an depicting an alternate embodiment thereof;

FIG. 4 is a view generally similar to the illustration of FIG. 3 depicting another alternate embodiment thereof;

FIG. 5 is a view generally similar to the illustration of FIG. 3 and showing yet another alternate embodiment thereof; and FIG. 6 is an illustration generally similar to that seen in FIG. 3 and setting forth yet another alternate embodiment of the invention.

DESCRIPTION OF THE PREFERRED EMBODIMENTS

Turning now to the drawings in which like reference characters indicate corresponding elements throughout the several views, attention is first directed to FIG. 1 which shows an assembly including a cylinder and a piston generally designated by the reference characters 10 and 12, respectively. Bore 13 having wall 14 is formed in cylinder 10. For purposes of orientation, cylinder 10 is considered to have an upper end 15, which end is normally closed by a cylinder head 17 having an inner surface 18 which may be planer, semispherical or other specific configuration.

Piston 12, reciprocally disposed within bore 13, includes outer cylindrical surface 19 and an end wall 20, which for purposes of orientation is considered the top. In the typical internal combustion engine, herein chosen for purposes of illustration as being representative of cylinder/piston assemblies in general, upper, intermediate and lower annular ring grooves are formed in piston 12. An annular seal, generally referred to as a piston ring, resides within each of the grooves. The several rings, being elastically expansive, exert an outward pressure for sealing against the surface of bore 14.

A space 25, normally referred to as the combustion chamber, resides within bore 13 between top 20 of piston 12 and surface 18 of head 17. Chamber 25 is a varying capacity in response to the reciprocal movement of piston 12 in directions as indicated by the arrowed line A. The piston rings carried in upper ring groove 22 and intermediate ring groove 23 seal against the expanding fluid, gases of combustion, in chamber 25. Piston ring carried in the lower ring groove 24 is for control of lubricating fluid, such as oil, generally carried in a reservoir at the open end of bore 13 below piston 12, not herein illustrated.

The foregoing brief description of a conventional internal combustion engine is set forth for purposes of reference. A further detailed understanding, without additional immediate description will be readily apparent to those skilled in the art to which the instant invention pertains. Further, those skilled in the art will immediately appreciate the analogous structure of other common cylinder and piston assemblies especially adapted for use with pressurized pneumatic and hydraulic fluid.

Reference is now made to FIG. 2 wherein ring groove 22, also representative of ring groove 23, is seen in further detail. The annular ring groove is generally rectangular in cross-section as defined by a generally planer upper surface 27 and opposed parallel lower surface 28 and a cylinderical inner surface 29. Surfaces 27 and 28 are generally referred to as the sides while surface 29 is referred to as the bottom of the ring groove. Ring groove 22 is open adjacent outer surface 19 of piston 12. To prevent contact between piston 12 and cylinder 10, outer cylindrical surface 19 of piston 12 has a smaller diameter than bore 13.

The foregoing description is typical of conventional commercial manufacture. The clearances or distances between surfaces, have been exaggerated for purposes of illustration. In actual practice, which reference to the exemplary contempory internal combustion engine, the width of the ring groove, distance between surfaces 27 and 28 is five sixty-fourths of an inch. The clearance between surfaces 14 and 19 is generally less than five thousandths of an inch.

Piston ring 30, an embodiment of the improved annular seal of the instant invention, is matingly received within ring groove 22. In general analogy to conventional commercially available piston rings, ring 30 is annular having a substantially rectangular cross-section as defined by top surface 32, undersurface 33, outer surface 34 and inner surface 35. Top surface 32 and under surface 33 are generally planer and parallel. Outer surface 34 and inner surface 35 are generally cylindrical and concentric. Outer surface 34, usually referred to as the face, projects from ring groove 22 beyond surface 19 to sealingly engage surface 14. In accordance with standard industrial tolerances for newly manufactured components, the vertical width, distance between surfaces 32 and 33, of ring 30 is approximately two thousandths of an inch less than the width of groove 22. The difference in dimension is known as ring side clearance. A substantially greater distance exists between inner surface 35 of ring 30 and inner surface 29 of ring groove 22.

As will be appreciated by those skilled in the art, during upward movement of piston 12 in the direction indicated by arrowed line B, surface 33 of ring 30 bears against surface 28 of groove 22. Owing to the inherent elastic expansiveness of ring 30, face 34 bears against the surface of wall 14. A conventional piston ring of standard manufacture fabricated of ductile iron, exhibits a tangential tension, total force in a direction of arrowed line C, of approximately sixteen to seventeen pounds. The exemplary ring, which normally weighs between fourteen and fifteen grams, moves at a nominal velocity in the range of three thousand to four thousand feet per second, the rate of travel of the piston.

At the top of the upstroke, piston 12 comes to a stop. Owing to inertia, the piston ring continues to move upwardly within the groove bringing surface 32 into contact with surface 27. The stop and reverse of direction of piston 12 is instantaneous. In response to the pressure of the gases of combustion, piston 12 begins a downstroke in the direction of arrowed line D. The gases move around the piston, also in the direction of arrowed line D, entering the clearance space between the piston and the bore. Theoretically, the gases initially urge the ring in the direction of arrowed line D bringing surface 33 of the ring into contact with surface 28 of the groove forming an airtight seal. Subsequentially, the gases flow into the space between surface 35 of the ring and surface 29 of the groove urging the ring in the direction of arrowed line C increasing the tangential tension of the ring and the sealing of face 34 against the surface of the wall 14.

The ring, in actual practice, however, does not respond instantaneous. Again owing to the forces of inertia, the ring tends to remain in the position established prior to the onset of the gases of combustion. Having energy associated with mass, the ring still tends to move in the direction of arrowed line B. Frictional contact between surfaces 34 and 14, supported by the tangential tension of the ring, tends to hold the ring stationary. The initial gas loading of the ring upon surface 32, after the ring has moved in the direction of arrowed line D brings surface 33 into frictional contact with surface 38 which opposes gas loading of the ring upon surface 35 for movement in direction of arrowed line C. Accordingly, the ring can be caused to vibrate in alternate directions indicated by arrowed lines B and D with gases passing around the ring and an ineffective seal between surfaces 34 and 14.

The improvements of the instant invention contemplate reducing the inertia of the ring for greater responsiveness.

In the immediately preferred embodiment viewed in FIG. 2, a recess in the form channel 37 having bottom 38 and inner and outer sidewalls 39 and 40 respectively, are formed into top surface 32 of ring 30. Second and third channels 42 and 43, respectively, are formed into ring 30 from under surface 33. Channels 37, 42 and 43 are uniformly continuous throughout ring 30. Walls 39 and 40 of channel 38 are concentric to surfaces 34 and 35. Channels 42 and 43 are generally arcuate in cross-section, the axes of which are concentric with surface 34 and 35.

In accordance with the immediately preferred embodiment of the invention, the several channels are sized such that the cross-sectional area of ring 30 is reduced by approximately one third. The overall dimensions of the cross-section, however, remain constant such that the improved ring is usable in a conventional pre-existing ring groove. The reduction in cross-sectional area reduces the mass of the ring by approximately one third. Correspondingly, a one third reduction in tangential tension is also realized. The improved ring, fabricated of ductile iron and of the same dimensions as the previously described exemplary conventional ring, weighs approximately twelve to thirteen grams and exhibits a torsional tension of nine to ten pounds. The area of face 34 remains constant, the area of contact between surfaces 32 and 33 and the respective surfaces of the ring groove is reduced by approximately sixty percent.

The increased responsiveness is immediately apparent. Due to the decreased mass, the ring is more responsive to the pressure of the gases of combustion flowing in the direction of arrowed line D. Friction between the piston and the several surfaces of the groove is substantially reduced. Friction between the face of the ring and the surface of the wall of the bore, in the free state unassisted by the gases of combustion during the upstroke, is decreased by approximately forty percent. During the downstroke, when assisted by the gases of combusion, the sealing force of ring 30 against the bore remain substantially constant with the previously described exemplary conventional ring. Further, channel 37 functions as a gas loading cavity to receive a portion of the gases entering between surfaces 27 and 32 thus ensuring that ring 30 is firmly seated against surface 28 of ring groove 22 prior to the possible escape of gases between surfaces 28 and 33.

FIG. 3 illustrates an alternate embodiment of the instant invention generally designated by the reference character 50 and including top surface 52, undersurface 53, outer cylindrical surface 54 and inner cylindrical surface 55. A groove 57, substantially the same as previously described groove 38, is formed into ring 50 from top surface 52. A second groove 58 of similar dimension is formed into ring 50 from undersurface 53. Groove 57 may be deeper than groove 58 to provide a larger gas loading cavity.

FIG. 4 illustrates another embodiment of the invention generally designated by the reference character 60 having top surface 62, undersurface 63, outer cylindrical surface 64, and inner cylindrical surface 65. A plurality of grooves 67 are formed in upper surface 62. A plurality of second grooves 68 are formed into under surface 63. Grooves 67 and 68 are generally similar to the previously described grooves 42, except that grooves 67 are deeper for reasons previously set forth.

An alternate embodiment of the invention, generally designated by the reference character 70 as seen in FIG. 5, includes top surface 72, undersurface 73, outer cylindrical surface 74, and inner cylindrical surface 75. As seen in cross-section, surfaces 72 and 73 converge from outer surface 74 to inner surface 75 of lesser height. The configuration, known in the art as a "fully keystone" ring, is of a conventional commercially manufactured type and is matingly received in a correspondingly shaped ring groove. Surfaces 72 and 73 are equiangularly displaced from horizontal.

Groove 77, generally similar to previously described groove 37, is formed in upper surface 72. Second grooves 78, generally similar previously described grooves 42 and 43, are formed into ring 70 from undersurface 73.

Alternate embodiment 80, having top surface 82, undersurface 83, outer cylindrical surface 84 and inner cylindrical surface 85 illustrated in FIG. 6, is of the configuration referred to as "half keystone". In the immediate embodiment, surface 83 is substantially horizontal while surface 82 slopes downwardly from outer surface 84 to inner surface 85. Formed into ring 80 are first groove 87 and second grooves 88 which correspond to grooves 77 and 78, respectively.

The structural and functional description and comments set forth in detail in connection with the embodiment generally designated by the reference character 30 as seen in FIG. 2, are applicable to the embodiments illustrated and described in connection with FIGS. 3, 4, 5 and 6.

The several channels can also be used to control ring twist, a function normally provided by machining a bevel or notch on a selected edge of the ring as well be appreciated by those skilled in the art. For example, a groove in the upper surface of greater depth than a groove in the undersurface will cause the face of the ring to twist upwardly. The reverse is also true.

Various modifications and changes to the embodiments herein chosen for purposes of illustration will readily occur to those skilled in the art. For example, in addition to ductile iron, the improved piston ring of the instant invention may be readily fabricated of other materials conventional in the art such as cast iron and aluminum. Friction reducing materials, such as chromium and molybdenum, may be utilized in accordance with conventional practice. Further, the improvements may be practiced with similar results on other piston ring configurations known in the art. While the foregoing description has been made specifically in connection with the internal combustion engine, it will be appreciated that the teachings of the instant invention are equally applicable to other types of cylinder and piston assemblies.

Having fully described and disclosed the instant invention and alternately preferred embodiments thereof in such clear and concise terms as to enable those skilled in the art to understand and practice the same, the invention claimed is:

1. In a piston ring for residing within a ring groove of a piston, which piston is disposed for reciprocal movement within a cylinder, which ring is generally annular and includes a top surface, an undersurface, an outersurface, and an innersurface, said surfaces defining a cross-section of fixed exterior dimension, and which ring groove includes an upper surface for receiving the top surface of said ring thereagainst, and a lower surface for receiving the undersurface of said ring thereagainst, and which cylinder includes a surface for sealingly receiving the outer surface of said ring, improvements therein for increasing the responsiveness of said ring, said improvements comprising:

at least one gas loading cavity in said top surface; and means for decreasing the inertia of said ring while preserving the fixed exterior dimensions of said cross-section.

2. The improvements of claim 1, wherein said means for reducing the inertia of said ring includes means for reducing the mass of said ring.

3. The improvements of claim 2, wherein said means for reducing the mass of said ring includes means defining a void in said ring.

4. The improvements of claim 3, wherein said means defining a void includes a recess formed into one of the surfaces of said ring.

5. The improvements of claim 2, wherein said means for reducing the mass of said ring includes means for reducing the area of the cross-section of said ring.

6. The improvements of claim 1, wherein the means for reducing the inertia of said ring includes means for reducing the area of contact between said ring and said ring groove.

7. The improvements of claim 6, wherein the means for reducing the area of contact between said ring and said ring groove includes means for reducing the area of a selected one of the surfaces of said ring which is receivable against a corresponding surface of said ring groove.

8. The improvements of claim 7, wherein said means for reducing the area of a selected one of the surfaces of said ring includes a recess formed into said selected one of the surfaces of said ring.

9. The improvements of claim 8, wherein said recess is in the form of a channel extending continuously along said selected one of said surfaces intermediate said inner and said outer surfaces.

10. The improvements of claim 9, further including a second channel extending continuously along the other of the surfaces of said ring which is receivable against a corresponding surface of said ring groove.

11. The improvements of claim 9, further including a companion channel formed into said ring and extending in spaced concentric relationship with first said channel.

* * * * *